United States Patent Office 3,171,392
Patented Mar. 2, 1965

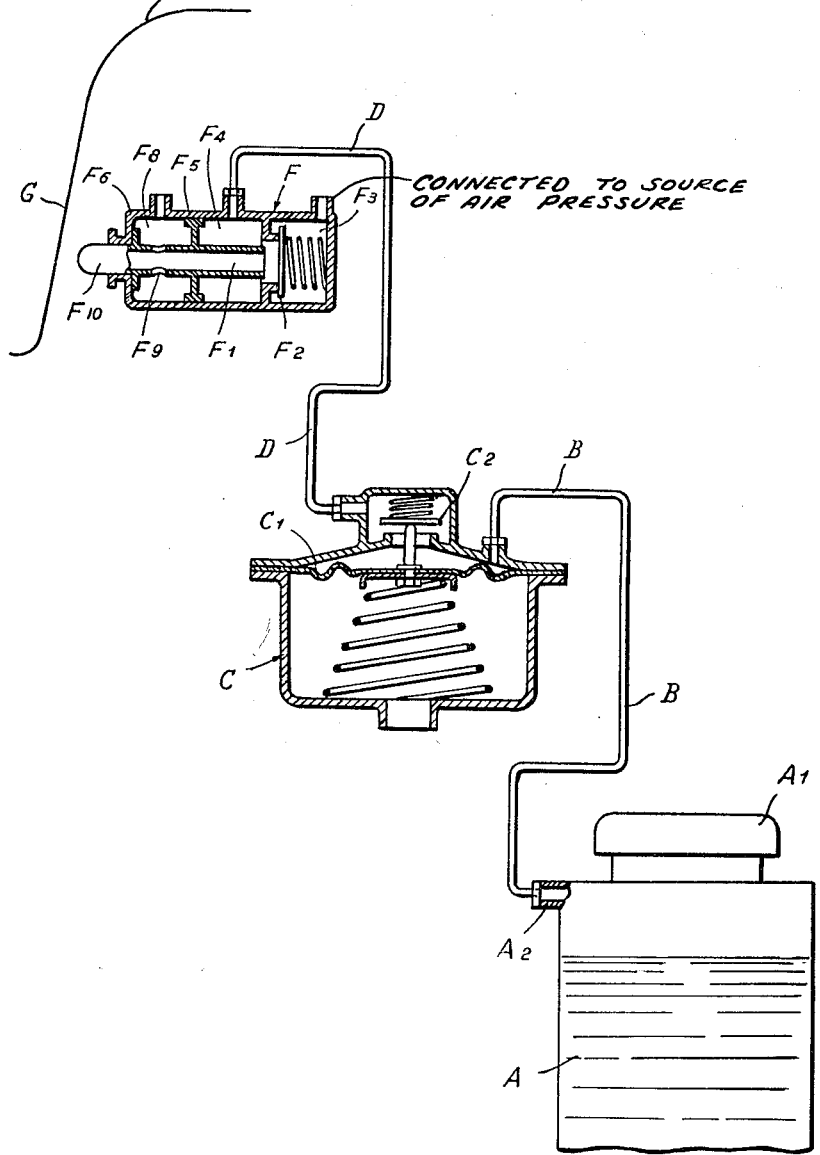

3,171,392
SYSTEM AND RELATED APPARATUS FOR THE COOLING PLANT OF INTERNAL COMBUSTION ENGINES
Giuseppe Alfieri, Milan, Italy, assignor to Fabbrica Italiana Magneti Marelli S.p.A., Milan, Italy, a corporation of Italy
Filed Mar. 28, 1963, Ser. No. 268,822
Claims priority, application Italy, Mar. 29, 1962, 21,913
4 Claims. (Cl. 123—41.01)

The present invention relates to a system and related apparatus for the cooling plant of internal combustion engines, the cooling being generally performed by means of an appropriate liquid, such as water.

The conventional systems of cooling the jacket of the internal combustion engines by means of water have the drawback of forming steam pockets in correspondence with the hotter zones of the engine, i.e. in the proximity of the cylinders, which causes damage and failure of the engine.

The purpose of this invention is to obviate the formation of these steam pockets, thus eliminating the above-mentioned inconveniences, and the like.

The system, according to the present invention, is characterized by the setting up of a certain pressure in the circuit of the cooling liquid of the engine in order to increase the boiling temperature of said cooling fluid so as to reduce and even to prevent the formation of steam pockets.

According to the invention, the pressurizing of the cooling circuit is achieved by means of a pressurized gas, such as compressed air.

The apparatus actuating the system under consideration is characterized in that the cooling circuit of the engine comprises a pressure generator adapted to set up and maintain in said circuit the desired pressure.

In a preferred form of the invention, to be applied in engines of motor vehicles provided with a compressed air generator, the plant comprises a pressure reducing valve fed by said compressed air generator and means adapted to control the pressure between the cooling circuit and the atmosphere, in order to be able to discharge the pressure from such cooling circuit, for checking purposes or the like.

The invention will now be explained in the following specification with reference to the accompanying drawing, which illustrates, by way of exemplification, the plant actuating the considered system.

The only figure of such drawing shows a schematic representation of the plant as applied to the engine of a motor vehicle, provided with an air compressed plant.

With reference to such figure, A shows a conventional radiator for the cooling fluid, provided with a cap $A_1$ for filling the radiator with water.

In the upper part, the radiator A has a pipe connection $A_2$ for a conduit B, leading to a pressure reducing device C of the conventional type, and whose diaphragm $C_1$ actuates a valve $C_2$, so as to put in communication the conduit B and a further conduit D. This conduit connects with a shunting valve F, actuated by an appropriate member, such as, for example, the motor-bonnet G, or also the cap $A_1$ of the radiator, for the purposes described hereinafter.

The shunting valve F comprises a hollow stem $F_1$ adapted to operate a retaining valve $F_2$ which controls the communication between a chamber $F_3$ fed by the compressed air tank of the pneumatic plant of the motor vehicle and a further chamber $F_4$, connected with the conduit B previously considered.

With the hollow stem $F_1$ is solidly connected a piston $F_5$, which tightly slides in the casing $F_6$ of the shunting valve F, being urged by the compressed air existing in the chamber $F_4$.

Such piston defines a further chamber $F_8$ communicating with the atmosphere and communicating also, in a manner which will be described later on, with chamber $F_4$ through holes $F_9$ provided in said stem.

The other end $F_{10}$ of such stem $F_1$ protrudes from the casing $F_6$ and is suitably shaped, in order to cooperate with the control member G, by way of example, with the cover of the motor hood.

In the position illustrated, the apparatus is in an inoperative position, i.e. in the position in which in radiator A is established the normal pressure (atmospheric pressure). In such case, the interception valve $F_2$ shuts up the communication between chambers $F_3$ and $F_4$ and said chamber $F_4$ is connected with the atmosphere through holes $F_9$ of the stem $F_1$ and chamber $F_8$.

When the engine is in normal operating condition and the motor-bonnet G is closed, the stem $F_1$ of the shunting valve F engages valve $F_2$ and the latter is displaced from its seat. Thereby communication is intercepted between chamber $F_4$ and the atmosphere, while, on the other hand, communication is established between said chamber $F_4$ and chamber $F_3$. The compressed air, therefore, of chamber $F_3$ passes into the pressure reducing device C and the pressure, reduced through such device, sets up in the upper portion of the radiator A and consequently in the hydraulic circuit of the cooling plant.

It follows that all the hydraulic circuit of the cooling plant, leading to said radiator A, remains under pressure, preventing the mentioned inconveniences. If, by way of example, in radiator A establishes a pressure of 7.1 to 14.2 pounds/sq. in., the boiling temperature of water increases to 230°–250° F., thus eliminating or, at least, reducing, at the normal operating temperatures, the possibility of formation of steam in the cooling circuit.

When the motor hood G is opened, the shunting valve F is actuated, and the pressure of the cooling circuit automatically releases. It is obvious that in the plant actuating the system, according to the invention several shunting valves F can be foreseen and this in dependence with the requirements arising from time to time.

By way of example, such shunting valve can be controlled, as said before, by the position of the cap $A_1$ of the radiator. Furthermore in such plant safety members can be foreseen, intended to discharge the over-pressures which arise sometimes in the cooling circuit.

Other modifications and changes may be made in the embodiment described and illustrated without departing from the scope of the invention as defined by the appended claims.

I claim:
1. In a cooling system for an internal combustion engine wherein there is a continuous circulation of liquid in a closed cooling circuit between the engine to be cooled and the radiator and wherein said engine is connected with an air compressor to permit placing said liquid under pressure, the combination comprising pressure reducing means connected, on one side, with said air compressor and, on the other side, with said cooling circuit and change-over valve means connecting said cooling circuit either to said air compressor or to the atmosphere to discharge the superpressure in said cooling circuit when access is desired to said internal combustion engine for any reason.

2. In a system according to claim 1, in which said change-over means is controlled by the internal combustion engine hood, so that when access is had to said engine, the discharge of the pressure of the cooling circuit takes place automatically.

3. In a system according to claim 1, in which said change-over means comprises a first chamber connected to said air compressor, a first valve, a second chamber connected to said pressure reducing means, a second valve cooperating with said first valve connected to the atmosphere so that when said two valves are disengaged from each other, said first valve intercepts communication between said first and said second chamber, and said second valve connects said second chamber and said pressure reducing means directly with the atmosphere, while, when said two valves are engaged with each other, they establish a direct communication between said first and said second chamber to pressurize said cooling circuit.

4. In a cooling system for an internal combustion engine wherein there is a continuous circulation of liquid in a closed cooling circuit between the engine to be cooled and the radiator and wherein said engine is connected with an air compressor to permit placing said liquid under pressure, the combination comprising pressure reducing means connected, on one side, with said air compressor and, on the other side, with said cooling circuit and manually operated change-over valve means connecting said cooling circuit either to said air compressor or to the atmosphere to discharge the superpressure in said cooling circuit when access is desired to said internal combustion engine for any reason.

References Cited by the Examiner
UNITED STATES PATENTS 1,694,071  12/28  Mallory _____ 123—41.02

FOREIGN PATENTS 1,097,151  2/55  France.
1,194,363  5/59  France.

RICHARD B. WILKINSON, *Primary Examiner.*

KARL J. ALBRECHT, *Examiner.*